US010240577B2

(12) United States Patent
Yarbrough et al.

(10) Patent No.: US 10,240,577 B2
(45) Date of Patent: Mar. 26, 2019

(54) THERMOPLASTIC AIRFLOW MODIFYING ELEMENTS FOR WIND TURBINE ROTOR BLADES

(71) Applicant: General Electric Company, Schenectady, NY (US)

(72) Inventors: Aaron A. Yarbrough, Greenville, SC (US); Christopher Daniel Caruso, Greenville, SC (US); Daniel Alan Hynum, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 621 days.

(21) Appl. No.: 14/860,910

(22) Filed: Sep. 22, 2015

(65) Prior Publication Data

US 2017/0082088 A1  Mar. 23, 2017

(51) Int. Cl.
*F03D 1/06* (2006.01)
(52) U.S. Cl.
CPC ........ *F03D 1/0675* (2013.01); *F05B 2230/10* (2013.01); *F05B 2230/232* (2013.01); *F05B 2240/221* (2013.01); *F05B 2280/4007* (2013.01); *Y02E 10/721* (2013.01); *Y02P 70/523* (2015.11)
(58) Field of Classification Search
CPC ..... B29C 73/10; B29C 65/02; B29C 65/3412; B29C 65/3416; B29C 65/342; B29C 43/203; B29C 44/569; B29C 70/446; B29C 70/465; B29D 99/0025; B29D 99/0028; F03D 1/0633; F03D 1/0675
See application file for complete search history.

(56) References Cited

U.S. PATENT DOCUMENTS

| 6,264,877 | B1 | 7/2001 | Pallu De La Barriere |
| 8,162,590 | B2 * | 4/2012 | Haag ..................... F03D 1/0633 |
| | | | 415/4.3 |
| 8,317,479 | B2 | 11/2012 | Vronsky et al. |
| 8,657,581 | B2 | 2/2014 | Pilpel et al. |
| 8,673,106 | B1 | 3/2014 | Jolley et al. |
| 8,747,098 | B1 | 6/2014 | Johnson et al. |
| 8,961,142 | B2 | 2/2015 | Wansink |

(Continued)

FOREIGN PATENT DOCUMENTS

| CN | 101906251 | 8/2010 |
| JP | 2007-92716 | 4/2007 |

(Continued)

*Primary Examiner* — Justin Seabe
(74) *Attorney, Agent, or Firm* — Dority & Manning, P.A.

(57) ABSTRACT

The present disclosure is directed to thermoplastic airflow modifying elements for a rotor blade for a wind turbine and methods of assembling same. The rotor blade may be constructed from at least one of a thermoset material or a thermoplastic material. Further, the rotor blade includes a blade shell defining an outer surface. Moreover, the rotor blade includes one or more layers of thermoplastic material infused to the outer surface of the blade shell so as to define one or more attachment locations. In addition, the rotor blade includes at least one airflow modifying element constructed, at least in part, from a thermoplastic material. Thus, the airflow modifying element(s) is welded to one of the attachment locations on the outer surface of the blade shell.

9 Claims, 8 Drawing Sheets

(56) References Cited

U.S. PATENT DOCUMENTS

| | | | |
|---|---|---|---|
| 8,992,813 B2 | 3/2015 | Robbins et al. | |
| 2009/0148300 A1 | 6/2009 | Driver et al. | |
| 2011/0097211 A1 | 4/2011 | Rudling | |
| 2013/0164133 A1 | 6/2013 | Grove-Nielsen | |
| 2014/0295187 A1 | 10/2014 | Jacobsen et al. | |
| 2016/0215757 A1* | 7/2016 | Behmer | B29C 70/086 |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

* cited by examiner

THERMOPLASTIC AIRFLOW MODIFYING ELEMENTS FOR WIND TURBINE ROTOR BLADES

FIELD OF THE INVENTION

The present disclosure relates generally to wind turbine rotor blades, and more particularly to thermoplastic airflow modifying elements for wind turbine rotor blades constructed of thermoset materials.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. More specifically, the rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The shell of the rotor blade is generally built around the spar caps of the blade by stacking layers of fiber fabrics in a shell mold. The layers are then typically infused together, e.g. with a thermoset resin.

It is also known in the art to change the aerodynamic characteristics of the rotor blades by adding aerodynamic add-on features, including but not limited to vortex generators, chord extensions, fairings, low noise trailing edge serrations, leading edge extensions, trailing edge extensions, spoilers, gurney flaps, stakes, protrusions, and/or other structures on the surface of the blade. Conventional rotor blade add-ons are typically bonded to the blade shell by applying a bonding agent or adhesive to the shell, positioning the blade add-on atop the adhesive, and allowing the adhesive to cure. Such bonding agents, however, can be expensive and time-consuming to apply.

Thus, the art is continuously seeking new and improved airflow modifying elements or add-on features for rotor blades and related assembly methods that address the aforementioned issues. More specifically, the present disclosure is directed to thermoplastic airflow modifying elements for wind turbine rotor blades that can be welded to the surface of the blade and therefore do not require an additional bonding agent.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a blade shell defining an outer surface. The blade shell is constructed, at least in part, from at least one of a thermoset material or a thermoplastic material. The rotor blade also includes one or more layers of thermoplastic material infused with the outer surface of the blade shell so as to define one or more attachment locations. Further, the rotor blade includes at least one thermoplastic airflow modifying element welded to one of the attachment locations on the outer surface of the blade shell.

In one embodiment, the one or more layers of thermoplastic material correspond to a contour of the outer surface of the rotor blade. In another embodiment, at least one of the blade shell or the airflow modifying element may be reinforced with at least one fiber material. More specifically, in certain embodiments, the fiber material may include at least one of glass fibers, carbon fibers, polymer fibers, ceramic fibers, nanofibers, metal fibers, or similar.

In further embodiments, the airflow modifying element(s) may include any suitable blade add-on including but not limited to vortex generators, chord extensions, fairings, low noise trailing edge serrations, leading edge extensions, trailing edge extensions, spoilers, fairings, gurney flaps, stakes, protrusions, or similar.

In additional embodiments, the attachment location(s) may be located at any suitable location on the outer surface of the rotor blade. For example, in one embodiment, the attachment location(s) may be include at least one of a leading edge, a trailing edge, a root section, or a tip section of the rotor blade, or any other suitable location on the surface of the rotor blade.

In certain embodiments, the blade shell may include an upper shell member and a lower shell member. In alternative embodiments, the blade shell may have a modular configuration such that the shell includes a plurality of blade segments.

In yet another embodiment, the rotor blade may also include a plurality of airflow modifying elements welded to a plurality of attachment locations on the outer surface of the blade shell.

In another aspect, the present disclosure is directed to a method for securing one or more airflow modifying elements to an outer surface of a rotor blade for a wind turbine. The method may include securing one or more pre-cured layers of thermoplastic material with a blade shell of the rotor blade so as to define one or more attachment locations. The method may also include welding at least one airflow modifying element constructed, at least in part, from a thermoplastic material, to one of the attachment locations.

In one embodiment, the method may include forming the blade shell, at least in part, of a thermoset material. More specifically, in certain embodiments, the step of forming the blade shell may include: placing an outer skin layer of composite material in a mold of the blade shell to form the outer surface of the rotor blade, placing at least one fiber material in the mold, infusing the outer skin layer, the one or more pre-cured layers of thermoplastic material, and the fiber material together via the thermoset material so as to form the rotor blade, and curing the rotor blade.

In another embodiment, the method may also include removing at least a portion of the outer skin layer to reveal the one or more attachment locations before welding the at least one airflow modifying element to one of the attachment locations of the cured rotor blade. More specifically, in certain embodiments, the step of removing at least a portion of the outer skin layer to reveal the one or more attachment layers further may include at least one of sanding, grinding, or machining the outer skin layer to reveal the one or more attachment locations therebeneath.

In another embodiment, the method may also include forming the at least one airflow modifying element via a thermoplastic material and at least one fiber reinforcement material. In particular embodiments, as mentioned, the airflow modifying element(s) may include any suitable blade add-on including but not limited to vortex generators, chord extensions, fairings, low noise trailing edge serrations, leading edge extensions, trailing edge extensions, spoilers, gurney flaps, stakes, protrusions, or similar.

In yet another aspect, the present disclosure is directed to a method for manufacturing a rotor blade of a wind turbine. The method includes placing an outer skin layer of composite material in a mold of a blade shell to form the outer surface of the rotor blade. The method also includes placing at least one of a fiber material or a core material in the mold atop the outer skin layer. Another step includes infusing the outer skin layer and at least one of the fiber material and the core material together via at least one of a thermoset material or a thermoset material so as to form the rotor blade. The method further includes curing the rotor blade. A further step includes securing at least one airflow modifying element to an attachment location of the cured rotor blade. In addition, the airflow modifying element is constructed, at least in part, from a thermoplastic material.

In one embodiment, the step of securing the airflow modifying element(s) to the attachment location of the cured rotor blade may include welding the airflow modifying element(s) to the attachment location of the cured rotor blade. In another embodiment, the step of securing the airflow modifying element(s) to the attachment location of the cured rotor blade may include bonding the airflow modifying element(s) to the attachment location of the cured rotor blade via an adhesive. In a further embodiment, the step of securing the airflow modifying element(s) to the attachment location of the cured rotor blade may include mechanically fastening the airflow modifying element(s) to the attachment location of the cured rotor blade.

In certain embodiments, as mentioned, the fiber material may include at least one of glass fibers, carbon fibers, polymer fibers, ceramic fibers, nanofibers, metal fibers, or similar.

In further embodiments, the method may also include forming the airflow modifying element via the thermoplastic material and at least one fiber reinforcement material. Further, as mentioned, the airflow modifying element(s) may include any suitable element as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
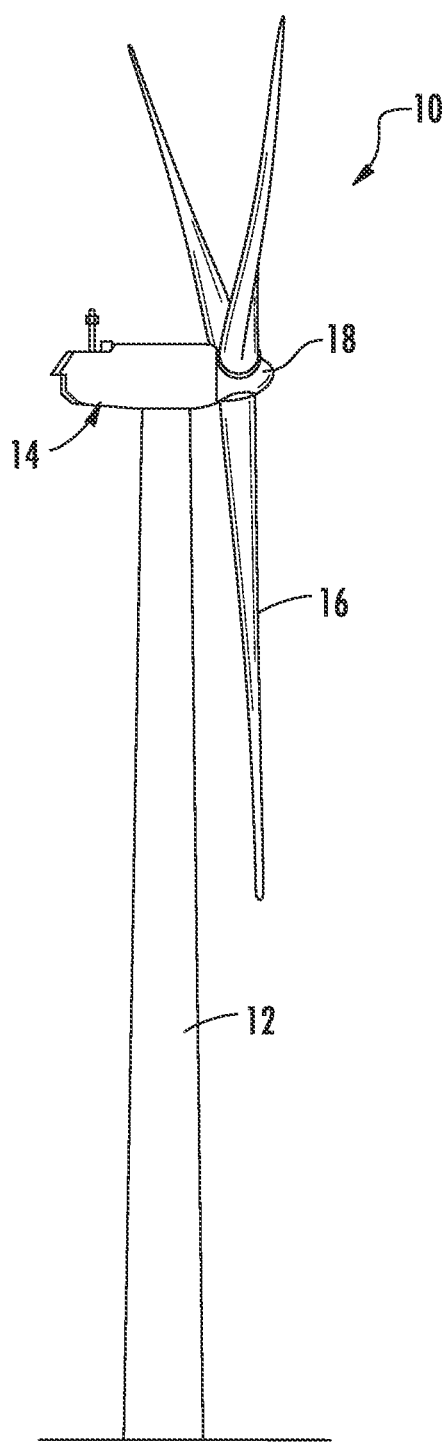
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to thermoplastic airflow modifying elements for a rotor blade of a wind turbine and methods of assembling same. More specifically, the thermoplastic airflow modifying elements may include vortex generators, chord extensions, fairings, low noise trailing edge serrations, leading edge extensions, trailing edge extensions, spoilers, fairings, gurney flaps, stakes, protrusions, and/or any other suitable structures on the surface of the rotor blade. In addition, the rotor blade may be constructed of a combination of thermoset and/or thermoplastic materials. Further, the thermoplastic material and/or the thermoset material as described herein may be reinforced with a fiber material, including but not limited to glass fibers, carbon fibers, polymer fibers, ceramic fibers, nanofibers, metal fibers, or combinations thereof. More specifically, where the rotor blade is constructed of a thermoset material, the rotor blade may include one or more thermoplastic attachment locations infused therewith. Thus, the thermoplastic airflow modifying elements can be easily secured to the thermoplastic attachment locations, e.g. via welding. Similarly, where the rotor blade is constructed of a thermoplastic material, the thermoplastic airflow modifying elements may also be easily welded to the thermoplastic blade at one or more locations on the outer surface of the blade.

Thus, the present disclosure provides many advantages not present in the prior art. For example, the present disclosure reduces the required materials for assembling the rotor blade, e.g. by eliminating the need for bonding agents to secure the blade add-ons to the blade surface. Thus, the rotor blades of the present disclosure can have a reduced weight by eliminating the typically required adhesives. In addition, the present disclosure simplifies the assembly process for blade add-ons by allowing the add-ons to be directly welded to the blade surface. As such, in certain embodiments, the thermoplastic blade add-ons can be economically and simply manufactured using known injection technologies, thereby further reducing associated manufacturing costs.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
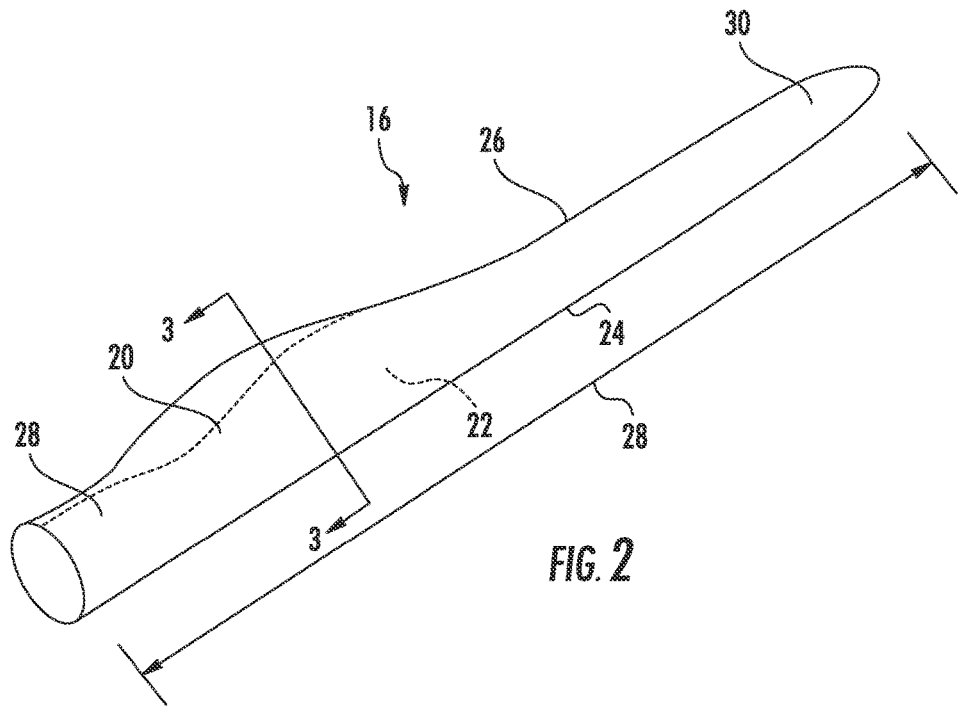
FIG. 2 illustrates a perspective view of one embodiment of a rotor blade of a wind turbine according to the present disclosure.

Referring now to FIG. 2, a more detailed view of one of the rotor blades 16 of FIG. 1 is illustrated. As shown, the rotor blade 16 includes a blade shell 19 having an upper shell member 20 and a lower shell member 22 that define an outer surface 21. Further, the upper shell member 20 is configured as the suction side surface of the blade 16, while the lower shell member 22 is configured as the pressure side surface of the blade 16. Thus, the upper and lower shell members 20, 22 generally serve as the outer casing/covering of the rotor blade 16 and may define a substantially aerodynamic profile, such as by defining a symmetrical or cambered airfoil-shaped cross-section.

The rotor blade 16 also includes a leading edge 24 and a trailing edge 26, as well as a blade root section 28 and the blade tip section 29. The blade root section 28 of the rotor blade 16 is configured to be mounted or otherwise secured to the rotor 18 (FIG. 1). In addition, as shown in FIG. 2, the rotor blade 16 defines a span 23 that is equal to the total length between the blade root section 28 and the blade tip section 29. The rotor blade 16 also defines a chord 27 that is equal to the total length between a leading edge 24 of the rotor blade 16 and a trailing edge 26 of the rotor blade 16. As is generally understood, the chord 27 may generally vary in length with respect to the span 23 as the rotor blade 16 extends from the blade root section 28 to the blade tip section 29.

Figure 3:
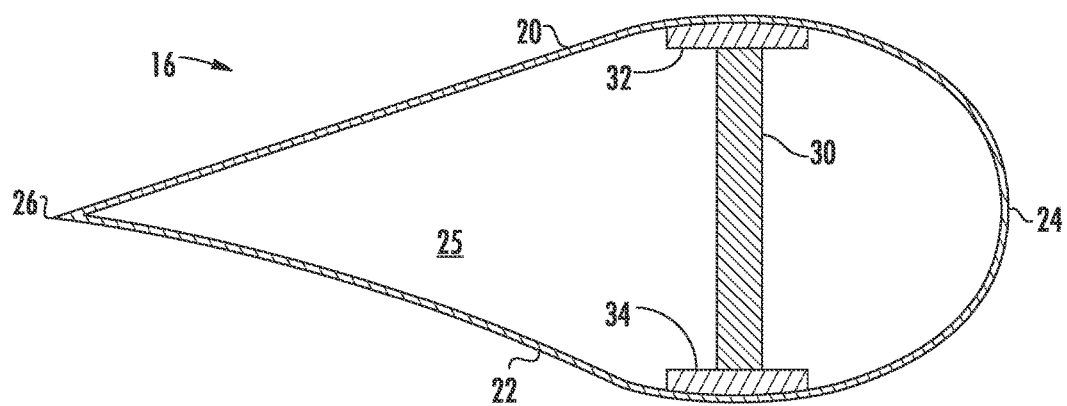
FIG. 3 illustrates a cross-sectional view of one embodiment of the rotor blade of FIG. 2 along line 3-3.

As is well known in the art, the upper shell member 20 and the lower shell member 22 may be joined together at the leading edge 24 and trailing edge 26 or any other suitable location. Further, the rotor blade 16 may also include an internal cavity 25 (FIG. 3) in which various structural members, such as spar caps 32, 34 and one or more shear webs 30 according to the present disclosure, may be configured. Thus, the spar caps 32, 34 may generally be designed to control the bending stresses and/or other loads acting on the rotor blade 16 in a generally span-wise direction (a direction parallel to the span 23 of the rotor blade 16) during operation of a wind turbine 10. In addition, the spar caps 32, 34 may be designed to withstand the span-wise compression occurring during operation of the wind turbine 10. Further, the shear web(s) 30 may be configured to increase the rigidity in the rotor blade 16.

In additional embodiments, the rotor blade 16 of the present disclosure may be a modular rotor blade, for example, such as the rotor blades described in U.S. patent application Ser. No. 14/753,137 filed Jun. 29, 2105 and entitled "Modular Wind Turbine Rotor Blades and Methods of Assembling Same," which is incorporated herein by reference in its entirety, have a modular panel configuration.

Referring to FIGS. 3 and 5-7, the upper shell member 20 may contain an upper spar cap 32 configured on an internal surface thereof. Similarly, the lower shell member 22 may contain a lower spar cap 34 configured on an internal surface thereof. The shear web(s) 30 extends between the spar caps 32, 34 along a longitudinal length of the blade 16 in a generally span-wise direction. The blade shell 19 may be constructed, at least in part, from a thermoset or a thermoplastic material. In addition, as mentioned, the thermoplastic and/or the thermoset material as described herein may optionally be reinforced with a fiber material, including but not limited to glass fibers, carbon fibers, polymer fibers, ceramic fibers, nanofibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component.

Referring now to FIGS. 4-7, the rotor blade 16 also includes one or more airflow modifying elements 35 configured on the outer surface 21 of the blade shell 19. More specifically, in certain embodiments, the airflow modifying elements 35 may include any suitable blade add-on, including but not limited to vortex generators, chord extensions, fairings, low noise trailing edge serrations, leading edge extensions, trailing edge extensions, spoilers, gurney flaps, stakes, protrusions, and/or other structures on the surface of the blade 16. In addition, the airflow modifying elements 35 may be constructed, at least in part, of a thermoplastic material. In further embodiments, the airflow modifying elements 35 may be reinforced, at least in part, with at least one fiber material, including but not limited to glass fibers, carbon fibers, polymer fibers, ceramic fibers, nanofibers, metal fibers, or similar or combinations thereof.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Figure 4:
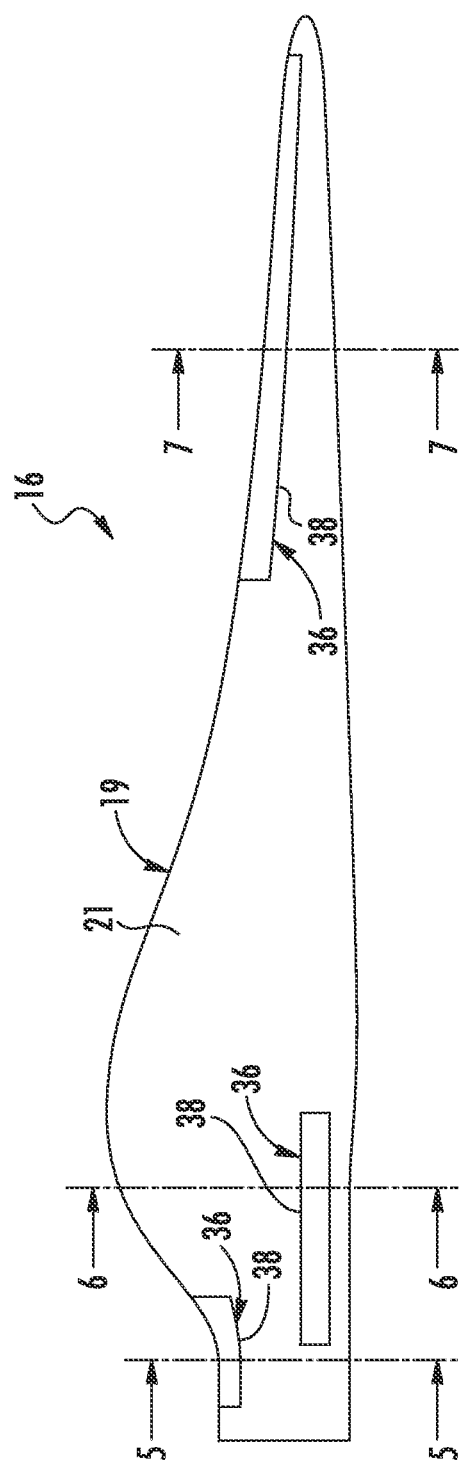
FIG. 4 illustrates a perspective view of another embodiment of a rotor blade of a wind turbine according to the present disclosure.
Figure 5:
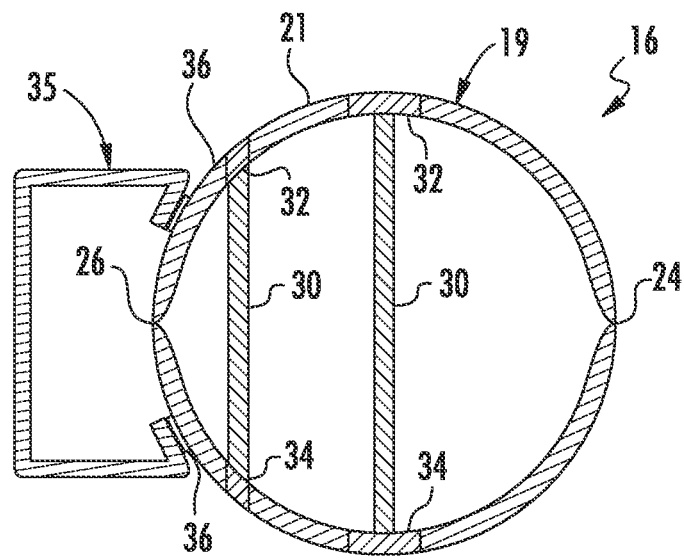
FIG. 5 illustrates a cross-sectional view of one embodiment of the rotor blade of FIG. 4 along line 5-5.
Figure 6:
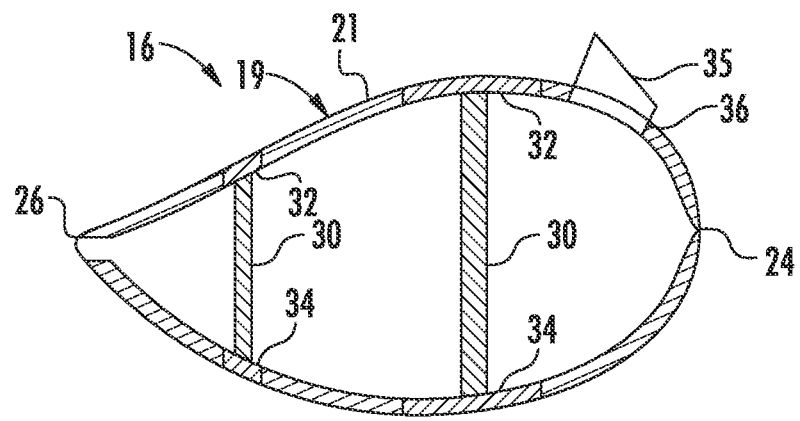
FIG. 6 illustrates a cross-sectional view of one embodiment of the rotor blade of FIG. 4 along line 6-6.
Figure 7:
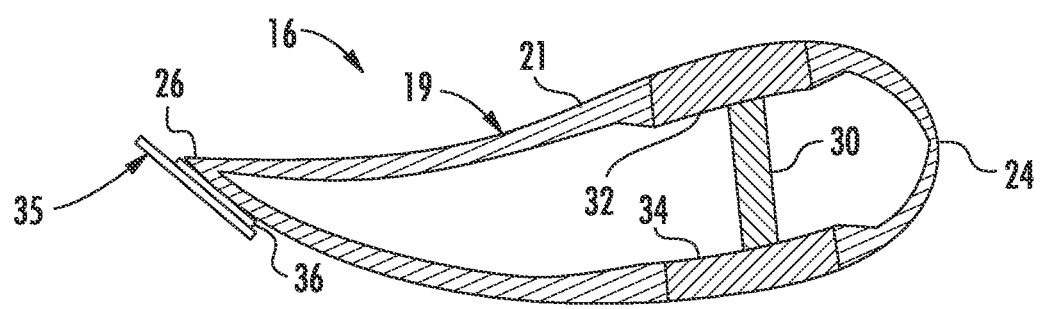
FIG. 7 illustrates a cross-sectional view of one embodiment of the rotor blade of FIG. 4 along line 7-7.

Referring still to FIGS. 4-7, the rotor blade 16 may also include one or more layers 36 of thermoplastic material infused to the outer surface 21 of the blade shell 19 so as to define one or more attachment locations 38. The attachment location(s) 38 may be located at any suitable position on the outer surface 21 of the rotor blade. For example, as shown in FIG. 4, the attachment location(s) 38 may be located at an outer periphery or near the side edges of the rotor blade 16. In further embodiments, the attachment location(s) 38 may be located at any other suitable position on the outer surface 21 of the blade shell 19 including but not limited to the leading and/or trailing edges as well as the blade root and/or tip sections. In addition, as shown, the attachment location(s) 38 may include a continuous strip of thermoplastic material, e.g. along the span 23 of the rotor blade 16, or spaced apart strips of thermoplastic material, e.g. spaced apart along the span 23 of the rotor blade 16.

Further, as generally shown in FIGS. 4-7, the rotor blade 16 includes at least one thermoplastic airflow modifying element 35 mounted to the attached location(s) 38. Thus, in certain embodiments, the thermoplastic airflow modifying element(s) 35 can be easily secured to one of the attachment locations 38 on the outer surface 21 of the blade shell 19, e.g. via welding.

In certain embodiment, as shown in FIGS. 4-7, the one or more layers 36 of thermoplastic material correspond to a contour of the outer surface 21 of the rotor blade 16. In addition, as mentioned, the airflow modifying element(s) 35 may include any suitable blade add-on including but not limited to vortex generators (FIG. 6), chord extensions, fairings, low noise trailing edge serrations, leading edge extensions, trailing edge extensions (FIG. 7) or fairings (FIG. 5), spoilers, gurney flaps, stakes, protrusions, or similar.

Figure 8:
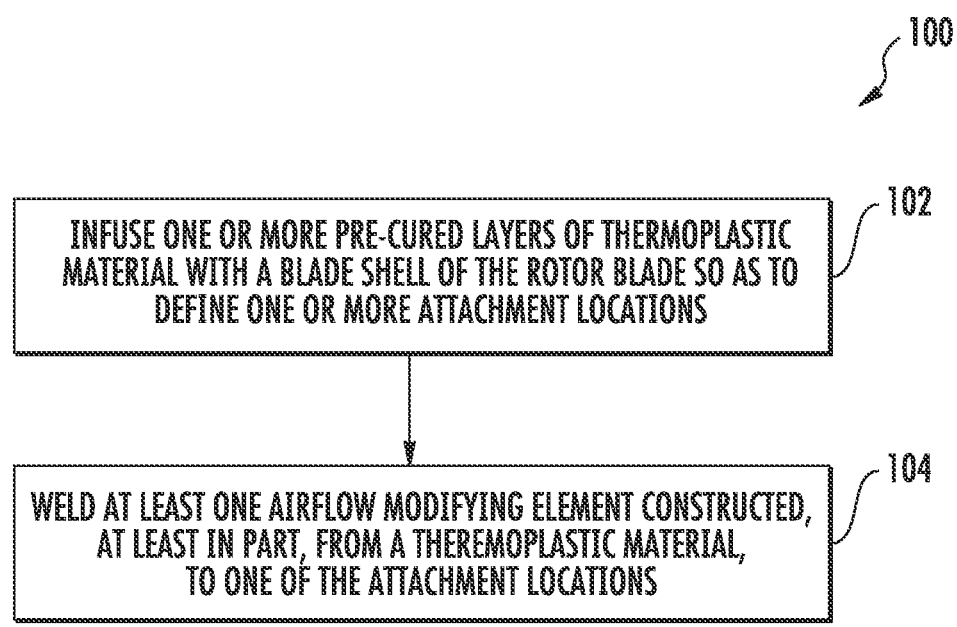
FIG. 8 illustrates a flow diagram of one embodiment of a method for securing one or more airflow modifying elements to an outer surface of a rotor blade for a wind turbine according to the present disclosure.
Figure 9:
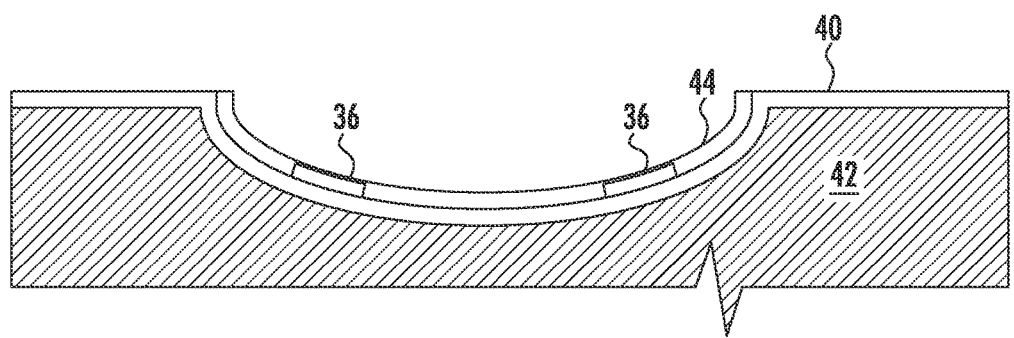
FIG. 9 illustrates a schematic diagram of one embodiment of a process for manufacturing a rotor blade of a wind turbine according to the present disclosure.
Figure 10:
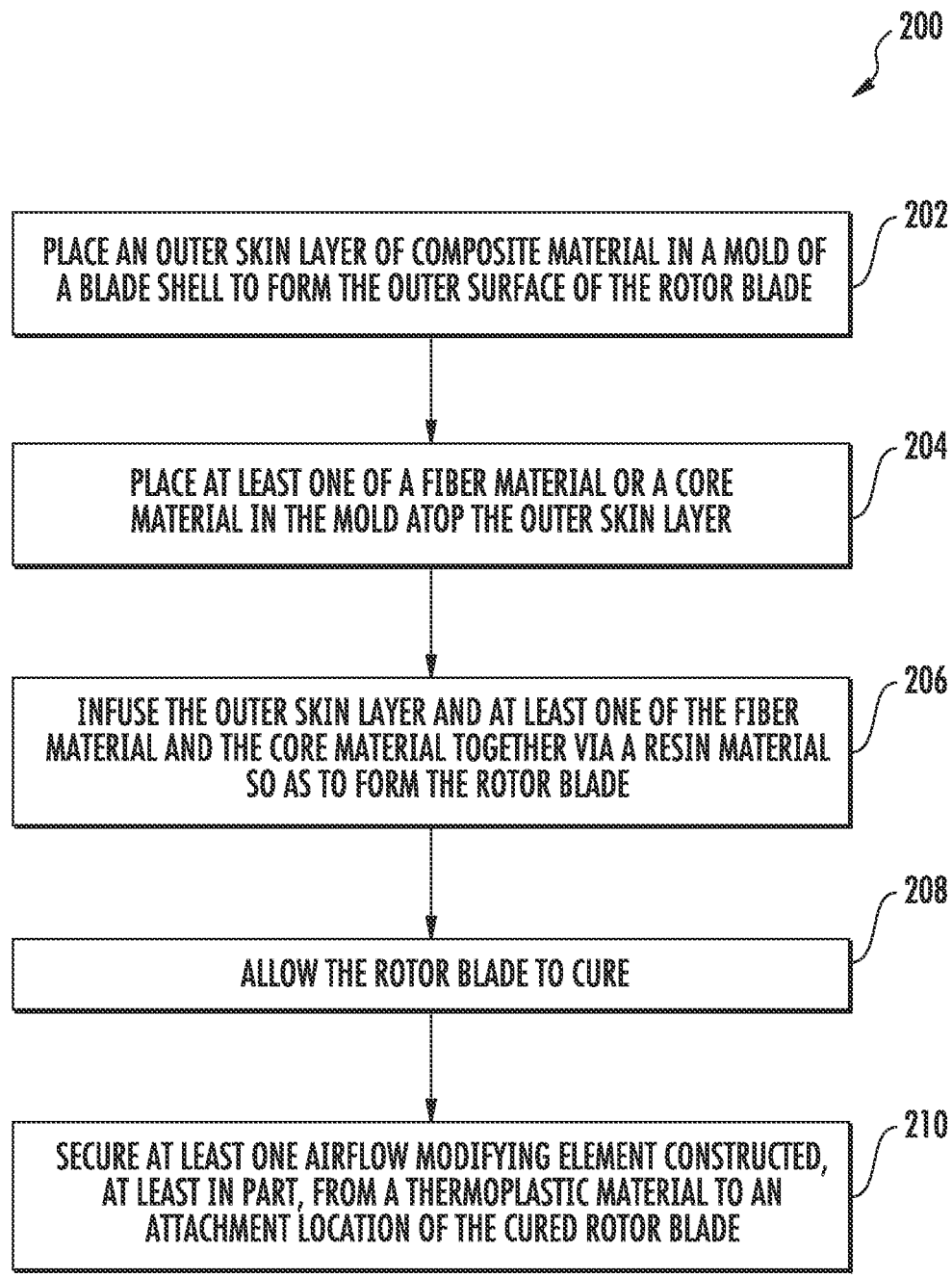
FIG. 10 illustrates a flow diagram of one embodiment of a method for manufacturing a rotor blade of a wind turbine according to the present disclosure.

Referring now to FIGS. 8-10, various embodiments of assembling the rotor blade 16 as described herein are illustrated. For example, as shown in FIG. 8, a flow diagram of one embodiment of a method 100 for securing one or more airflow modifying elements 35 to an outer surface 21 of a rotor blade 16 for a wind turbine 10 according to the present disclosure is illustrated. As shown at 102, the method 100 includes securing one or more pre-cured layers 36 of thermoplastic material with a blade shell 19 of the rotor blade 16 so as to define one or more attachment locations 38 (FIG. 4). As such, in certain embodiments, the pre-cured layers 36 of thermoplastic material are configured to change the functional groups at the attachment locations 38 so as to assist with joining blade add-ons to the blade shell 19.

More specifically, in certain embodiments, the method 100 may include forming the blade shell 19, at least in part, of a thermoset material. In such an embodiment, a thermoplastic resin (also optionally reinforced with a fiber material) may be infused around at least a portion of the already-cured thermoset blade shell 19. Thus, the thermoplastic resin system is configured to coat the blade shell 19 so as to allow subsequent welding procedures to take place during assembly of the rotor blade 16 (e.g. to allow the thermoplastic blade add-ons 35 to be welded to the thermoplastic blade shell 19). Further, the thermoplastic resin may encapsulate the entire blade shell 19 or only certain regions of the blade shell 19 to allow subsequent welding with the blade add-ons 35. Moreover, such regions may be broken up by span or chord-wise directions and do not necessarily have to be continuous.

Alternatively, as shown in FIG. 9, where the blade shell 19 is a thermoset component, the thermoplastic layer(s) 36 may be placed onto the mold surface of the blade shell 19. More specifically, as shown, the step of forming the blade shell 19 may include placing an outer skin layer 40 of composite material in a mold 42 of the blade shell 19 to form the outer surface 21 of the rotor blade 16. Further, the method 100 may include placing one or more pre-cured layers 36 of thermoplastic material and optionally a fiber material 44 in the mold 42 atop the outer skin layer 40. As such, the method 100 also includes infusing the outer skin layer 40, the one or more pre-cured layers 36 of thermoplastic material, and the fiber material 44 together via the thermoset material so as to form the rotor blade 16 and then allowing the rotor blade 16 to cure. Thus, when the rotor blade 16 is cured, the thermoset resin will bond to the pre-cured thermoplastic layer(s) 36. When the structure is demolded, the thermoplastic layer(s) 36 will be on the outer surface of the thermoset structure, which provides welding surfaces on the thermoset component.

Thus, as shown at 104, the method 100 may also include welding at least one airflow modifying element 35 constructed, at least in part, from a thermoplastic material, to one of the attachment locations 38 on the outer surface 21 of the rotor blade 16. More specifically, in certain embodiments, the method 100 may include removing at least a portion of the outer skin layer 40 to reveal the one or more attachment locations 38 (i.e. the layers 36 of thermoplastic material) before welding the airflow modifying element(s) 35 to one of the attachment locations 38 of the cured rotor blade 16. For example, in certain embodiments, the step of removing at least a portion of the outer skin layer 40 to reveal the one or more attachment locations 38 may include at least one of sanding, grinding, or machining the outer skin layer 40 to reveal the one or more attachment locations 38 therebeneath.

Referring now to FIG. 10, a flow diagram of one embodiment of a method 200 for manufacturing a rotor blade 16 of a wind turbine 10 according to the present disclosure is illustrated. As shown at 202, the method 100 includes placing an outer skin layer of composite material in a mold of a blade shell to form the outer surface of the rotor blade. As shown at 204, the method 100 includes placing at least one of a fiber material or a core material in the mold atop the outer skin layer. As shown at 206, the method 100 includes infusing the outer skin layer and at least one of the fiber material and the core material together via a resin material (e.g. thermoplastic resin or thermoset resin) so as to form the rotor blade. As shown at 208, the method 100 includes allowing the rotor blade 16 to cure. As shown at 210, the method 100 includes securing one or more thermoplastic airflow modifying elements 35 to an attachment location 38 of the cured rotor blade 16.

In one embodiment, the step of securing the airflow modifying element(s) 35 to the attachment location(s) 38 of the cured rotor blade 16 may include welding the at least one airflow modifying element to the attachment location of the cured rotor blade. In another embodiment, the step of securing the airflow modifying element(s) 35 to the attachment location(s) 38 of the cured rotor blade 16 may include bonding the airflow modifying element(s) 35 to the attachment location(s) 38 of the cured rotor blade 16 via an adhesive. Alternatively, the step of securing the airflow modifying element(s) 35 to the attachment location(s) 38 of the cured rotor blade 16 may include mechanically fastening the airflow modifying element(s) 35 to the attachment location(s) 38 of the cured rotor blade 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for securing one or more airflow modifying elements to an outer surface of a rotor blade for a wind turbine, the method comprising:
    placing an outer skin layer of composite material in a mold of a blade shell of the rotor blade to form the outer surface of the rotor blade;
    arranging one or more pre-cured layers of thermoplastic material in the mold of the blade shell of the rotor blade with the outer surface so as to define one or more attachment locations;
    infusing the outer skin layer and the one or more pre-cured layers of thermoplastic material via a resin material so as to form the rotor blade;
    curing the rotor blade;
    removing at least a portion of the outer skin layer to reveal the one or more attachment locations; and
    subsequently welding at least one airflow modifying element constructed, at least in part, from a thermoplastic material, to at least one of the attachment locations.

2. The method of claim 1 wherein the resin material comprises a thermoset material.

3. The method of claim 2, further comprising:
    placing at least one fiber material in the mold;
    infusing the outer skin layer, the one or more pre-cured layers of thermoplastic material, and the fiber material together via the thermoset material so as to form the rotor blade.

4. The method of claim 1, wherein removing at least a portion of the outer skin layer to reveal the one or more attachment locations further comprises at least one of sanding, grinding, or machining the outer skin layer to reveal the one or more attachment locations therebeneath.

5. The method of claim 1, further comprising forming the at least one airflow modifying element via a thermoplastic material and at least one fiber reinforcement material, the at least one airflow modifying element comprising at least one of vortex generators, chord extensions, fairings, low noise trailing edge serrations, leading edge extensions, trailing edge extensions, spoilers, fairings, gurney flaps, stakes, or protrusions.

6. A method for manufacturing a rotor blade of a wind turbine, the method comprising:
    placing an outer skin layer of composite material in a mold of a blade shell to form the outer surface of the rotor blade;
    placing at least one of a fiber material or a core material in the mold atop the outer skin layer;
    placing one or more pre-cured layers of thermoplastic material in the mold of the blade shell so as to define one or more attachment locations;
    infusing the outer skin layer, at least one of the fiber material or the core material, and the one or more pre-cured layers together via at least one of a thermoset material or a thermoplastic material so as to form the rotor blade;
    allowing the rotor blade to cure;
    removing at least a portion of the outer skin layer to reveal the one or more attachment locations; and,
    subsequently welding at least one airflow modifying element constructed, at least in part, from a thermoplastic material, to an attachment location of the cured rotor blade.

7. The method of claim 6, wherein the fiber material comprises at least one of glass fibers, carbon fibers, polymer fibers, ceramic fibers, nanofibers, or metal fibers.

8. The method of claim 6, further comprising forming the airflow modifying element via the thermoplastic material and at least one fiber reinforcement material.

9. The method of claim 8, wherein the at least one airflow modifying element further comprises at least one of vortex generators, chord extensions, fairings, low noise trailing edge serrations, leading edge extensions, trailing edge extensions, spoilers, fairings, gurney flaps, stakes, or protrusions.

* * * * *